United States Patent [19]
Karras

[11] 3,881,088
[45] Apr. 29, 1975

[54] FLOWING VAPOR HIGH POWER LASER
[75] Inventor: Thomas W. Karras, Berwyn, Pa.
[73] Assignee: General Electric Company, Fairfield, Conn.
[22] Filed: May 24, 1974
[21] Appl. No.: 473,278

Related U.S. Application Data
[62] Division of Ser. No. 343,417, March 21, 1973, abandoned.

[52] U.S. Cl. ............... 219/271; 13/23; 219/275; 219/284
[51] Int. Cl. .............................................. F22b 1/28
[58] Field of Search.... 219/271, 272, 275, 284–286, 219/288–291, 294, 10.51, 10.65; 60/203; 118/48, 49, 49.1, 49.5; 13/23

[56]  References Cited
UNITED STATES PATENTS
| | | | |
|---|---|---|---|
| 1,546,061 | 7/1925 | Drefehl | 219/285 |
| 1,628,376 | 5/1927 | Valentine | 13/23 |
| 2,363,781 | 11/1944 | Ferguson | 118/49 X |
| 3,058,842 | 10/1962 | Kahan et al. | 118/49 X |
| 3,083,288 | 3/1963 | Vischer, Jr. | 219/288 |
| 3,350,885 | 11/1967 | Hall | 219/275 X |
| 3,400,241 | 9/1968 | Gloersen et al. | 219/10.65 |
| 3,647,197 | 3/1972 | Holloway | 118/49.1 X |

Primary Examiner—C. L. Albritton
Attorney, Agent, or Firm—Allen E. Amgott; Raymond H. Quist; Henry W. Kaufmann

[57] ABSTRACT

Metal vapor, e.g., copper vapor, is expanded into a vacuum, its thermal energy being converted into translational, with consequent cooling. It passes between electrodes between which a short electrical discharge excites it to the upper laser state, from which it passes by lasing action to a metastable state initially relatively unpopulated because of low vapor temperature. The vapor velocity is such that the metastable atoms are replaced by a fresh supply of unexcited atoms before the next discharge, the used vapor being conveniently condensed upon a collector, although in operation in space this might be omitted.

4 Claims, 6 Drawing Figures

FLOWING VAPOR HIGH POWER LASER

This is a division of application Ser. No. 343,417, filed Mar. 21, 1973, now abandoned.

The invention herein described was made in the course of a contract with the Department of the Air Force.

BACKGROUND OF THE INVENTION

1. Field of the Invention

This invention pertains to metal-vapor lasers.

2. Description of the Prior Art

The use of metal vapor lasers is known. They have generally operated in an equilibrium vapor produced by an oven surrounding the entire laser cavity. This has limited the efficiency of the device because up to 19 KW of power was needed just to maintain the vapor. Furthermore, since the energy storage capacitor must be placed in a cool region the leads bringing the discharge current into the metal vapor must be long and thus have relatively high inductance. This leads to a discharge pulse much longer than the emitted laser pulse and wastes energy. Finally, since the lower laser state is metastable and so cannot be used in the next discharge, a diffusion process must be depended upon to bring these atoms to the laser walls where they can be de-excited for further use. This is a relatively slow process and limits the laser repetition rate and thus its average power.

SUMMARY OF THE INVENTION

As has been noted in the description of the prior art, certain atoms are known which can readily be excited to an upper lasing state, e.g., by electrical (Townsend) discharge from which they lase to a lower state which is metastable. All the atoms of this kind known to the applicant are metals, which must be vaporized for use. Efficient laser operation requires that a large proportion of the atoms be initially in a state from which they can readily be excited — the ground state in the cases under consideration; and, ideally, that the exciting discharge be terminated whenever the lasing process is over. Furthermore, if the threshold for lasing is to be low, the thermal population of the lower laser state must be kept low. This requires that the gas used be cool enough so that thermally excited population of the metastable lower state is negligible. Since some of the metals suitable for lasing are copper and gold, it is apparent that providing the vapors of such metals in a lasing space in a relatively cool condition is not a feat to be performed under equilibrium conditions. Another problem associated with the use of gases such as I consider, which end their lasing in a metastable state from which they can not be excited back to the upper state by the electrical discharge I have described, and which stay for relatively long times (e.g., many milliseconds) in that state, is that the metastable atom is not reusable; any energy it absorbs will not appear as useful laser output. The conventional way of disposing of metastable atoms has been to wait until they diffuse out of the lasing volume and are brought to ground state by contact with a solid part of the apparatus.

I solve two problems simultaneously by a vapor source in which the metal vaporized and expanded adiabatically through apertures which, regardless of their particular shape, serve as nozzles. The vapor so undergoes a conversion of much of its thermal energy to kinetic; and since the conversion is adiabatic, the temperature of the vapor decreases. The time of the laser excitation and radiation is so small, as has been described, that it is at least highly impractical to produce vapor at such a velocity that its residence time in the working or lasing volume is only equal to that time; waiving the technical feasibility, the kinetic energy in the vapor would be so great relative to the desired energy radiated by the vapor (or, more generally, gas) that the efficiency would be very low for this reason. On the other hand, it is desirable to operate at a high pulse rate in order to achieve high average power, and efficiency will be improved by removing the metastable atoms from the working volume before the exciting pulse is repeated. For a typical path, through the lasing space, of a few centimeters, a gas velocity of the order of $10^5$ centimeters per second will permit pulsing rates of the order of a hundred kilohertz. Within a very broad range of velocities this approximates an optimum. High repetition rates of excitation with shorter pulse widths are adapted to production of very rapid rise times which are also conducive to efficiency; ideally, to excite all available atoms to the upper state before lasing occurs would conduce to maximum efficiency.

Technically least titillating, but of importance to efficiency and practical use, is the fact that the form of apparatus I teach can all be approximately at room temperature except for the vapor source, which is the major source of heat loss to the surroundings.

With these preliminaries, an embodiment particularly designed around the use of copper is generally described.

DESCRIPTION OF THE PREFERRED EMBODIMENTS

Figure 1:
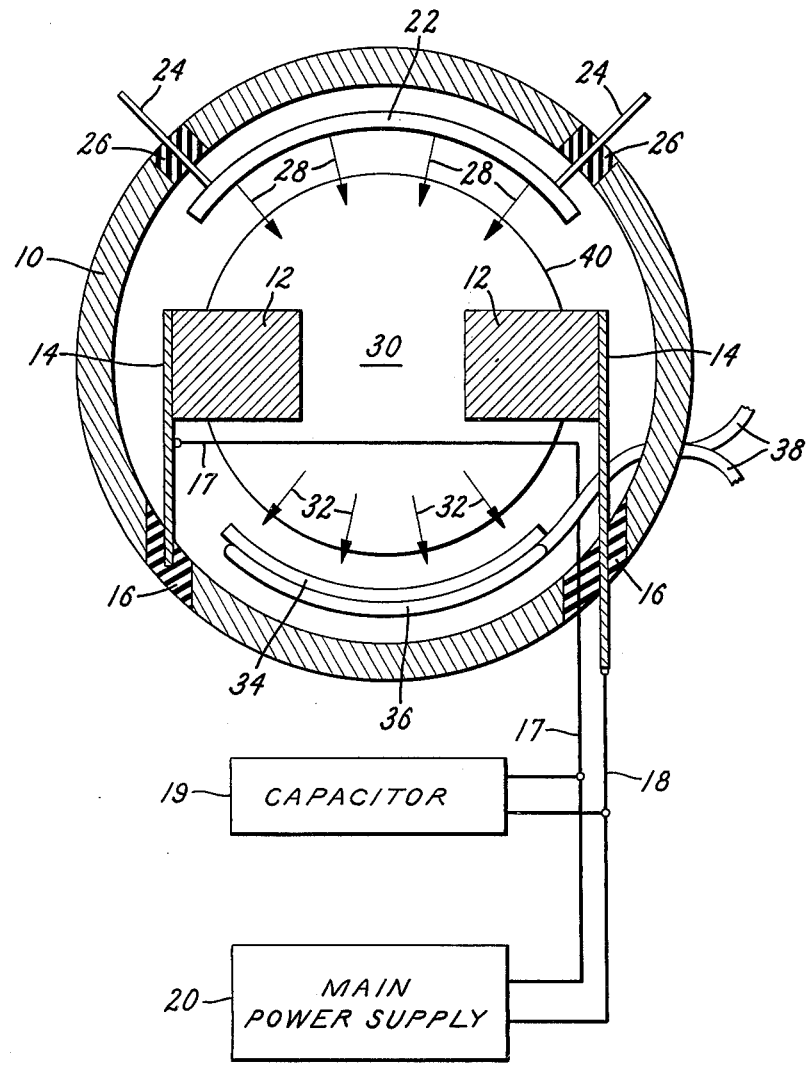
FIG. 1 is a schematic representation of the generic laser.
Figure 2:
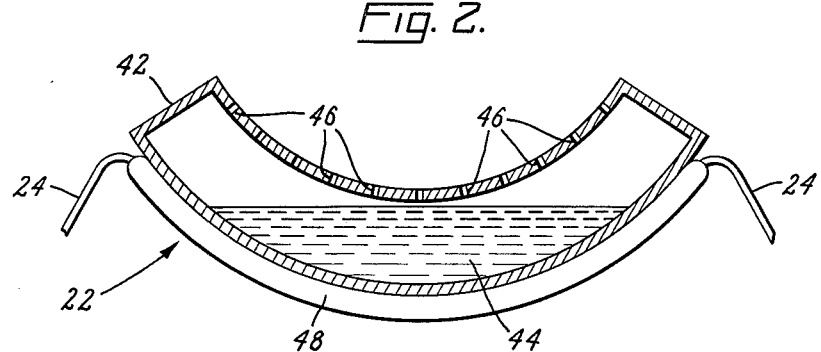
FIG. 2 is a sectional view of the copper vapor source 22 in FIG. 1.
Figure 4:
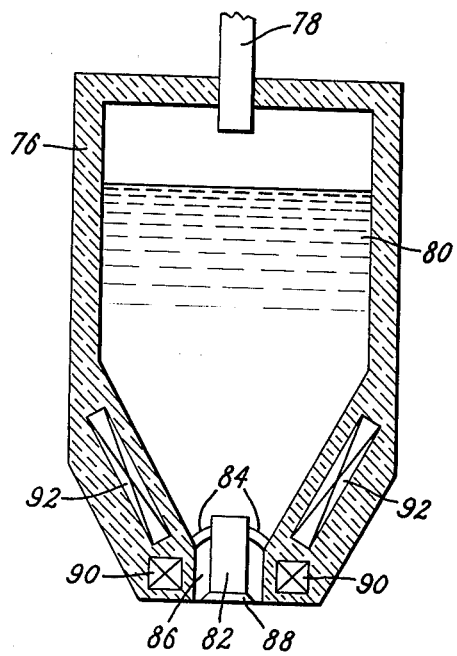
FIG. 4 is a sectional view of an embodiment of a copper vapor source 22 in FIG. 1.
Figure 5:
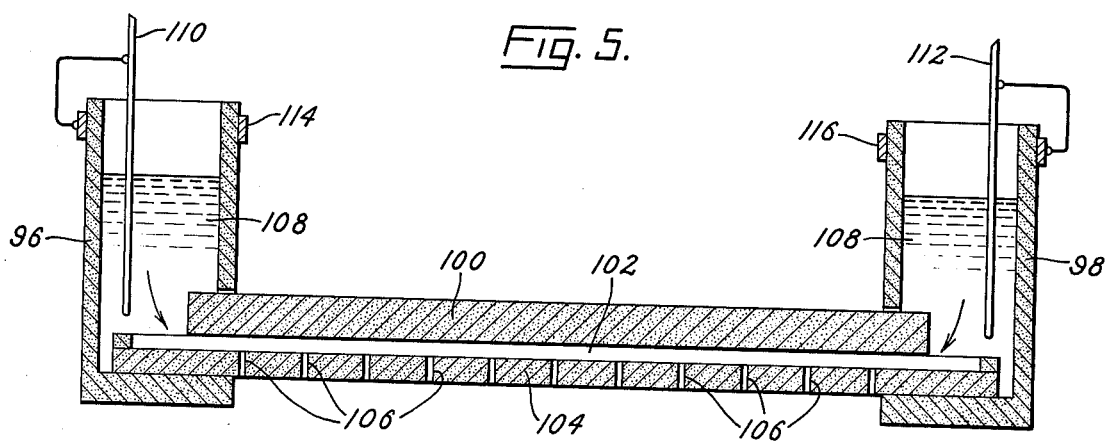
FIG. 5 is a sectional view of an embodiment of a copper vapor source.

FIG. 1 represents schematically and in section a generic embodiment of my invention. Inside a metal housing 10, which may be generally circularly cylindrical and is shown sectioned normal to its central axis, aa pair of opposed electrodes 12 are represented, supported on strip supports 14, extending into insulating seals 16 in the wall of housing 10, and connected by conductors 17 and 18 across a capacitor 19, and a main power supply 20. A copper vapor source 22, not sectioned since represented generically here, and represented in various detailed embodiments in FIGS. 2, 4, and 5, is supported on conductors 24, which extend through insulating seals 26 in the wall of housing 10. Regardless of the particular embodiment of copper vapor source 22 which is employed, it discharges copper vapor at high velocity as indicated by the arrows 28 through the interelectrode volume 30, from which it exits as indicated by arrows 32 to impinge and be condensed upon the surface of condenser 34, not sectioned, which is cooled by cooling coils 36 at its back, which coils are connected via their external ends 38 to a source of circulating coolant not shown. A mirror 40 is represented as part of the conventional optical system, the front portion having been removed by the sectioning.

FIG. 2 represents a simple form of copper vapor source 22, in which a hollow housing 42 contains a charge 44 of copper. The inner face of the housing 42 is pierced with apertures 46 forming nozzles. A heater 48 is in thermal contact with the outer face of housing 42, and is provided with energy through conductors 24. The heater 48 raises the temperature of the entire assembly sufficiently not only to melt the copper 44 but to produce a vapor pressure of copper sufficient to produce the desired velocity of copper vapor after it has been expanded through the apertures 46. In this particular embodiment of copper vapor source 22, which is not generally my preferred form but is shown for simplicity to assist in a first explanation of the functioning of the embodiment of FIG. 1, the attitude of the housing 42 must be as shown, so that the molten copper will not be in direct contact with the apertures 46. Therefore the embodiment of FIG. 1 must be inverted from the attitude shown in FIG. 1.

Given a flow of copper vapor from the copper vapor source 22, preferably at a velocity of the order of $10^5$ centimeters per second, producing a density in the interelectrode volume 30 of $10^{15}$ to $10^{17}$ atoms per cubic centimeter (which is suitable for lasing of copper), the capacitor 18 is charged by main power supply 20 to a potential sufficient to cause a discharge between electrodes 14 of duration preferably 1–20 nanoseconds or less. In accordance with the known art, the 2P quantum level population of the copper atoms will be inverted with respect to those of the 2D level lying just below it. Laser action will then take place, with emission at 5,106 Angstroms. Now, by the prior art practice, the copper atoms which have "lased" will be left in a metastable state, in which they will remain for an appreciable time so that further energy inputs during that time will not produce further lasing, but will be converted wastefully into other undesired modes. However, in the embodiment of my invention, the copper atoms are moving at high velocity so that the atoms which have lased and are in a temporarily useless metastable state move to condenser 34, where they are condensed, and a fresh supply of atoms available for lasing moves into interelectrode volume 30, so that the process may then be repeated without further delay.

The particular materials employed in this embodiment are not critical, but may be those conventional in the art. However, it merits mention that electrodes 12, while they will usually be of conventional refractory electrically conductive material such as tungsten or molybdenum, may also, if adequately cooled, be made of copper, since any sputtering of a copper electrode will not add any foreign material to the copper vapor present. It is also to be observed that if the laser were to be operated in an ambient vacuum, the condenser 34 could be omitted, and some suitably located aperture which permitted the "used" copper vapor to pass out into the ambient space could serve as a sink for the copper vapor quite as well as the condenser 34. In simplest and most general terms, what is essential for the practice of my invention is a structure of opposed electrodes defining an interelectrode volume (or other means of producing an electric field in such a volume), a source of copper vapor at high velocity directed into the interelectrode volume, and a sink for the copper vapor which leaves the interelectrode volume, plus suitable power supply means connected to the electrodes, and means (which may either be the housing 10 and the various closures in it which seal it from external atmosphere, or the same plus a connected vacuum pumping system) for maintaining a sub-atmospheric pressure in the range suitable for lasing. This should not be taken to exclude the possibility of using an appropriate buffer gas (e.g., argon or helium) to help carry the discharge.

Figure 3:
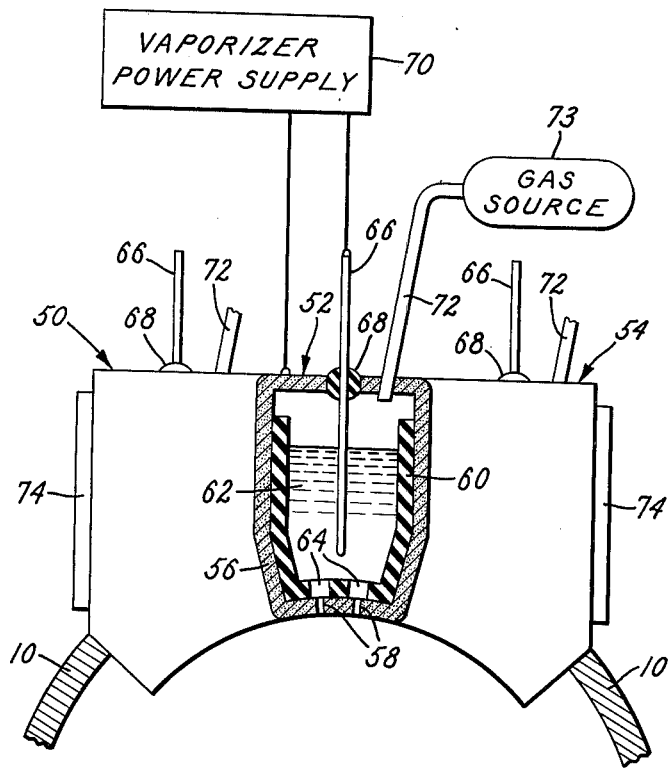
FIG. 3 is a sectional view in part of an embodiment of the copper vapor source 22 in FIG. 1.

FIG. 3 represents, partly in section, an embodiment of a copper vapor source 22 which employs the teachings of U.S. Pat. No. 3,350,885 of Hall and Karras, assigned to the assignee of the present invention, to which reference is made for detailed discussion of its principles. There are represented by three similar units, 50, 52, and 54, of which only 52 is shown in section. The external bodies of units 50, 52, and 54 are of a conductor capable of operation at the temperature of molten copper. They may conveniently be made of graphite. As a matter of convenience, they are represented as forming a part of housing 10, and must necessarily be joined hermetically to each other and to housing 10, either by suitable ceramic cement, or by brazing or other suitable means. Referring to the sectioned view of unit 52, there are represented at the bottom of its housing 56 two nozzles 58 of capillary width such that liquid copper will not flow through them. For simplicity of illustration only two nozzles 58 are represented, but they may be more numerous. Also, if it is chosen to make units 50, 52 and 54 long — that is, in a direction normal to the figure — then nozzles 58 may conveniently be long narrow slits extending substantially along the entire length of unit 52. Inside housing 56 there is an electrically insulating (and, in view of the temperatures involved, preferably ceramic) lining 60 which contains a charge 62 of copper. When copper 62 is molten it lies within lining 60 and so would be electrically insulated from housing 56, except for the presence in lining 60 of metering apertures 64, which extend above nozzles 58, but are somewhat larger, since it is necessary that the molten copper 62 be able to enter them and make contact with the bottom of housing 56 in the vicinity of nozzles 58. An electrode 66, insoluble in molten copper and conveniently of tungsten is sealed by a seal 68 through the upper part of housing 56, and extends down into the molten copper 62 for electrical contact therewith. It is connected to one terminal of vaporizer power supply 70, whose other terminal is connected to housing 56. When a pulse of energy is applied from vaporizer power supply 70 to electrode 66, current flows through the comparatively large area of the bulk of 62, which will manifest relatively low resistance; but the path through the molten copper in metering apertures 64, because of their smaller cross section, will have relatively high resistance, and most of the pulse energy will be dissipated in the copper in them, vaporizing it. While nozzles 58 are so small in one dimension that they will retain liquid copper, the copper vapor will be expelled through them in the manner indicated by arrows 28 of FIG. 1. Thus metering apertures 64 serve in fact to meter the volume of copper which will be vaporized by a signal pulse of energy. An elbow 72 is represented penetrating the upper part of housing 56, permitting the entrance of gas (preferably a gas inert to molten copper such as nitrogen) from gas source 73 to maintain pressure upon the upper surface of molten copper 62 to insure that it will move down and replenish metering apertures 64. Heaters 74 are represented attached to the assembly of units 50, 52, and 54 to maintain the copper 62 in molten condition. While the actual permissible dimensions of nozzles 58 will depend somewhat upon the surface energies of the material of housing 56 relative to that of molten copper 62, a dimension of 0.002 inches is suggested.

It may be desirable to operate the embodiment of FIG. 3 continuously rather than by pulses. In such case, metering apertures 64 will obviously not serve to meter the volume of copper in a pulse; but they will still be required to create a high-resistance portion of the path through the molten copper 62 immediately adjacent to nozzles 58 in order that the now continuous energy flow from vaporizer power supply 70 will be dissipated mostly adjacent to the nozzles 58. However, continuous operation will also require the pressure of gas from gas source 73 to equal (except for the slight pressure provided by the depth of molten copper 62) the pressure required to force the liquid copper through apertures 64 as fast as it is needed.

The electrodes 66 and elbows 72 of units 50 and 54 will, of course, be connected respectively to vaporizer power supply 70 and gas source 73 like those of unit 52. It will be perceived that the embodiment of copper vapor source 22 represented in FIG. 4 will be oriented like the symbolic representation of copper vapor source 22 in FIG. 1 — that is, the source 22 will be uppermost.

FIG. 4 represents an embodiment of a copper vapor source 22 employing the teachings U.S. Pat. No. 3,400,241, of Gloersen, Gorowitz, and Karras, assigned to the assignee of the present application, to which reference is made for detailed discussion. Its general appearance is similar to that of the embodiment of FIG. 3; but the principle of operation is different: instead of means for passing current by conduction through the molten metal to be vaporized, the molten metal is formed into a closed loop in which current is induced magnetically. Specifically, there is represented in section a housing 76 which is preferably of ceramic or other suitable insulating material, provided with an entrance tube 78 for applying gas pressure to a charge 80 of molten copper. The external shape of housing 76 is made to correspond to that shown for unit 52 of FIG. 3; and it is evident that units according to this embodiment may be made in shapes like those of units 50, 52, and 54 of FIG. 3, and joined hermetically with ceramic cement to form a part of envelope 10, in the manner shown in FIG. 3. In the lower end of housing 76 there is represented a plug 82, which may conveniently be held in place by ceramic ribs 84. Plug 84 is of insulating, preferable ceramic, material, and by its presence causes the portion of the molten copper charge 80 to form a conductive ring 86 in the space between plug 82 and housing 76. The lower end of plug 82 has a tapered flange 88 of dimensions suitable to reduce the space between it and housing 76 at that region to capillary size, such that it will not pass liquid copper, so that the molten copper 80 will not simply run out. A coil or solenoid 90, shown in cross section, is enclosed by the housing 76; and, as taught in the referenced U.S. Pat. No. 3,400,241, a pulse of current in solenoid 90 will induce current in the ring 86, which will dissipate sufficient energy to vaporize the copper and discharge it as a puff of vapor through the capillary opening adjacent to flange 88. While it is possible to maintain the copper charge 80 molten by the attachment of external heaters similar to 74 of FIG. 3, there is represented here in section an additional coil 92 which may be supplied with a continuously alternating current to induce eddy currents in the body of the copper charge 80 to maintain it molten. Solenoid 90 may also be supplied, with a continuously alternating current of such magnitude as to provide continuous vaporization of the copper in the ring 86, producing a continuous flow of copper vapor. As was pointed out in connection with FIG. 3, continuous operation will require that the pressure of gas supplied via entrance tube 78 be sufficient to maintain a continuous acceleration and resultant flow of copper vapor. As with the embodiment of FIG. 3, the dimensions of the structure represented in FIG. 5 normal to the drawing may be adjusted as a matter of design convenience.

It is to be noted that it would be desirable that the plug 82 be ferromagnetic; but the temperature of molten copper (over 1,000°C.) requires the provision of a material having a Curie point higher than this or alternatively the insertion in the interior of plug 82 but thermally insulated from it a ferromagnetic material with cooling means to keep it below its Curie point. Such complication is extremely unlikely to be justified; it is in general much simpler to employ an alternating current supply of frequency sufficiently higher to afford adequate transfer between solenoid 90 and the loop 86.

It is possible to make housing 76 of a refractory metal either of high resistivity so that it will not shield the copper loop 86 too much from the influence of solenoid 90, or to provide it with ceramically insulated slits to break the paths of currents which would be induced in it; but in general I do not prefer this approach, although it might be preferable for some particular design requirements. Energy dissipated in a high resistivity housing would not be a total loss, since it could be taken into account as part of the energy required to maintain the copper charge 80 molten.

In the embodiments of FIGS. 3 and 4, it will in actual design be desirable to provide access openings for replenishing the copper supply 80; but such means are completely conventional in the art and are therefore not represented, since they would burden the drawings with detail to no benefit.

Figure 6:
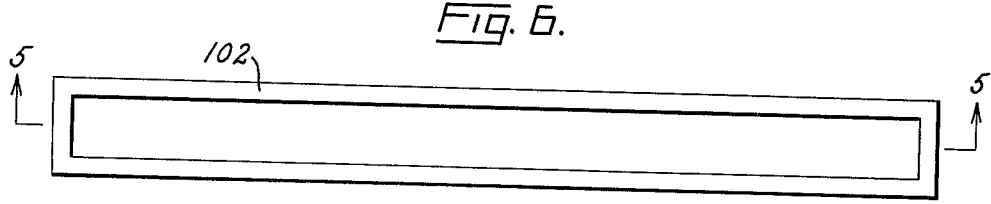
FIG. 6 is a plan view of the space 102 of FIG. 5.

A vapor source particularly suited to provide vapor along a considerable length is represented by sectioned FIG. 5. Graphite cylindrical containers 96 and 98, whose walls may conveniently be of the order of 0.050 inches thick, serve as the terminals of an assembly, also of graphite, of a cover 100, a spacer 102, and a nozzle plate 104. The plan of spacer 102 is represented by FIG 6. In a typical design, spacer 102 and nozzle plate 104 may be 10 centimeters long, and ½ centimeter wide. Cover 100 will be of the same width, but slightly shorter to provide access from the interior of containers 96 and 98 to the interior of shim 102, as indicated by arrows. Nozzle plate 104 is provided with a plurality of nozzles 106, which in practice will be more numerous than it is feasible to represent. They may conveniently be drilled holes of the order of 0.015 inches in diameter. In operation, both containers 96 and 98 will contain a mass of molten metal, copper in the specific instance considered. Refractory conductors 110 and 112 not soluble in the molten metal 108 (conveniently tungsten in the present instance) make contact with the metal 108 and through it also to the graphite structure. Alternatively electrical contact can be made directly through reservoirs 96 and 98. Connections to a power source are not represented since it is completely conventional in the prior art.

Because the electrical conductivity of molten metals, particularly of copper, is very high, it is desirable that the path of molten copper which is formed when molten copper 108 enters the interior of spacer 102, by flow in the direction indicated by the arrows, should be of small cross section to maximize its resistance. The current required to heat the copper in that path to its vaporization temperature must be conveyed, in conventional design, into a hermetically sealed envelope; and for practical reasons it must be kept within reasonable values. Therefore a desirable thickness for spacer 102 (which determines the height or thickness of the copper path lying between cover 100 and nozzle plate 104) is 0.005 inches. However, the surface tension of molten copper is so high that very considerable pressure would be required to be applied to the surface of metal 108 in containers 96 and 98 to force it into such a narrow space on a graphite surface; and if such pressure were applied, it could cause the copper to run out through the nozzles 106 in liquid form before it could be vaporized, unless they were of impractically small diameter. Therefore the lower surface of cover 100 is covered, prior to assembly, preferably by cathode sputtering, with a coating of some material such as tungsten carbide or tantalum carbide, which is readily wet by molten copper, so that the copper will tend to move into the confined space without any appreciable pressure applied to the metal surface. The upper surface of nozzle plate 104 is desirably also thus coated, with suitable precautions to insure that the coating is not applied to the interior of nozzles 106, which would cause the copper to leak out of them in liquid form. To reduce thermal radiation from the bottom of nozzle plate 104, the bottom may be similarly coated with tatalum carbide (which has low thermal emissivity), as may the top of cover 100.

Since surface tension will prevent molten copper from passing through small openings in graphite, the assembly of cover 100, shim 102, and nozzle plate 104 has been accomplished satisfactorily by making the openings in the walls of containers 96 and 98 of the same shape (within tolerances of a few thousandths of an inch) as the rectangular shape formed by the stacked cover 100, shim 102, and nozzle plate 104, and simply putting the parts together in proper relationship with a graphite clip along each edge. While a commercial graphite cement has also been used to seal all joints, it appears unnecessary to do so, and the advantages of ready disassembly of the uncemented joints render the simpler method preferable. Wettable coatings must, of course, be kept off any faces which will form such uncemented joints.

The representation of FIG. 5 shows the copper charge 108 already molten. (The sectioning to represent a liquid has been restricted, since to carry it through the capillary space in shim 102 would confuse the drawing.) If containers 96 and 98 are initially filled with particulate copper, the contact it affords between conductors 110 and 112 and the graphite structure may be inadequate; for this reason auxiliary refractory metal collars 114 and 116 are represented surrounding the top portions of containers 96 and 98 respectively, also connected to conductors 110 and 112. When current is initially applied, assuming poor conduction through the particulate copper, most of the current will flow through the collars to graphite structure, heating it until the particulate copper melts as represented by 108 in FIG. 5. The superior contact between molten copper 108 and conductors 110 and 112 will then cause the current to flow primarily through it, and much less through the collars 114 and 116 and the walls of containers 96 and 98. A variety of other auxiliary heaters may also be used to melt the copper within reservoirs 96 and 98. As the molten charge then enters the capillary space, the resistance between the conductors 110 and 112 will decrease continuously, and the voltage must be reduced. Continuously tapped adjustable transformers (of the kind known, inter alia, as Variac and Transtat in commerce) permit such adjustments conveniently. The final value of current must, of course, be that which produces vaporization at the desired rate.

Other metals, such as bismuth and lead, are suitable for use in a laser according to my invention. Since their electrical conductivity is much lower than that of copper, it is permissible to make the height of spacer 102 for such use appreciably greater, e.g., 0.080 inches. In such case, the provision of special wettable coatings such as the tungsten carbide or tantalum carbide I have described may be omitted, and the head provided by, e.g., a centimeter of molten metal head (108) in containers 96 and 98 will suffice to feed the metal, without forcing liquid metal through 0.015 inch diameter nozzles.

It should be observed that the embodiment represented by FIG. 5 has the desirable characteristic that as it is made longer it requires higher voltages, but no increase in current. Except for the thickness of spacer 102 and proper diameter of nozzles 106, it has no critical dimensions. Particularly for use with long electrodes of the rail type, it is extremely desirable, and for such use I prefer it. This configuration has the further advantage of being very efficient since conduction losses are always very small and radiation losses can be made so leaving only vaporization to carry off the heat.

While the embodiments have been described in terms of the use of copper as a working substance because it has known desirable properties which benefit particularly from the virtues of my invention, other metals, for example bismuth lead and gold, can benefit similarly. In general, any metal whose upper lasing state can be excited readily as by electrical discharge, whose lower lasing state is metastable, can benefit by my basic teaching of producing by heating a metal vapor of high density and high velocity at a temperature low enough so that the lower laser state is very sparsely populated, and of employing this velocity to remove metastable atoms from the working volume in order that the pulsing rate may efficiently be much higher than the reciprocal of the lifetime of the metastable atoms. The teachings also permit the operation of lasers having very large working (or lasing) volumes, since both the density and the total volume of vapor provided may be high.

To summarize, I have taught apparatus for producing desired transitions (that is, in the particular application, lasing) in a gas by exciting the gas from its ground state to an upper state from which the desired transition terminates in a metastable state. In such an excitation the upper state should be resonant with the ground state, i.e., be the source of resonance radiation of high transition probability. The metastable state has a much lower probability of excitation from the ground state than does the upper state. I provide electrodes as excitation means which operate in a working volume where the exciting discharge occurs. I provide source and flow means — the vaporizer and nozzle combination — to provide an effectively continuous flow (having pointed out that a rapid continual vaporization is effectively the same as a continuous flow) of gas into the working volume at a high velocity which, as I have explained, is limited primarily by energy considerations. This velocity must be such that the residence time of the gas — that is, the average time that a small selected volume of the moving gas will remain in the working volume — is at least approximately equal to the average time required to excite the gas to the upper state plus the average lifetime of the upper state until its transition to the lower state, since there would be no point to removal of the gas from the working volume before it had performed its desired function. But, in order for my invention to produce benefit over the prior art, this time should be less than the diffusion time of the atoms of the gas to the boundaries of the working volume; since if the metastable atoms are given time to diffuse out of the working volume, even the prior art teaches how to operate after the metastable ions have diffused away, ultimately to become discharged by collision with part of the apparatus. Since, however, it is a benefit of my invention that the repetition rate of producing the desired transitions — the repetition rate of the exciting discharges — may be made high, the residence time must also not be greater than the interval between discharges — the reciprocal of the repetition rate.

It is a useful feature of my teaching that I provide removal means to remove the gas from the apparatus at the end of its residence in the working volume by a surface with means to maintain it at a temperature sufficiently low to condense the gas. This minimizes condensation of the vapor upon other parts of the apparatus, which may particularly readily otherwise occur since my teaching permits operating the general structure at a low temperature relatively to the heated vapor source.

The source and flow means which I teach comprises, in some embodiments, container means to contain a store of the atoms of the gas in a condensed nongaseous — that is, initially solid and later liquid or molten state; heating means to heat those atoms to vaporize them; and nozzle means to expand the vapor in order that a part of its energy may be converted into kinetic energy with beneficial results which I have described.

A particular embodiment which I have described with reference to FIGS. 5 and 6 comprises two containers adapted to contain the metal, and a vaporizer tube which has a passageway extending through it and connected to the interiors of the containers, with capillary nozzles which extend through the wall of the tube to its outside. This tube, in generic description, in my preferred embodiment is formed by cover 100, spacer 102, and nozzle plate 104 as a matter of convenient assembly; but it is a tube just as a wooden pipe formed of hooped staves is a tube. I provide electrical conductors in each container which are adapted to make contact with metal in the containers for passage of current through metal in the containers and in the passageway, to vaporize the latter. This particular embodiment may be useful in other applications than a laser where it is desired to provide metal vapor, as for example in the study of gas discharge phenomena for purposes other than lasing. A particular useful improvement in this embodiment, whose advantages I have described, is to make the interior surfaces of the passageway of material wettable by the liquid metal, while the interior surfaces of the nozzle are not wettable by the liquid metal in order that it may not run in the liquid form through the nozzles, negating their capillary nature which otherwise prevents this. In the specific embodiment I have taught, I teach the use of a coating of tantalum carbide or tungsten carbide to render the surface wettable, the non-wettable surface being graphite.

While I have taught particular apparatus, I also have taught the method of operating a laser whose working substance is a gas whose lower lasing state is metastable, by removing the metastable gas and replacing it with gas of the same kind but not in the metastable state, and exciting the replacing gas to lase, within a time period after the excitation which produced the metastable gas which is less than the lifetime of the metastable state. This method, generally, permits operation at high repetition rates.

What is claimed is:
1. Source and flow means to produce a flow of metal vapor comprising:
   h. two containers adapted to contain the said metal;
   i. a vaporizer tube having a passageway extending through it which is connected to the interiors of the said containers and which is provided with capillary nozzles which extend through the wall of the said vaporizer tube to its outside;
   j. electrical conductors in each said container adapted to make contact with metal contained in the container for passage of electrical current through the said metal and through metal in the said passageway to vaporize it.

2. The source and flow means claimed in claim 1 in which
   k. the interior surface of said passageway thereof is wettable by the said metal when liquid but the interior surface of the therein said nozzles is not wettable by the said metal when liquid.

3. The source and flow means claimed in claim 2 in which the interior surface of said passageway comprises tantalum carbide, and the interior surface of the therein said nozzles is of graphite.

4. The source and flow means claimed in claim 2 in which the interior surface of said passageway of claim 4 and further comprises tungsten carbide, and the interior surface of the therein said nozzles is of graphite.

* * * * *

UNITED STATES PATENT OFFICE
CERTIFICATE OF CORRECTION

PATENT NO. : 3,881,088
DATED : April 29, 1975
INVENTOR(S) : Thomas W. Karras

It is certified that error appears in the above-identified patent and that said Letters Patent are hereby corrected as shown below:

In the Claims, Claims 2 and 4 should appear as follows:

2. The source and flow means claimed in claim 1 in which k. the interior surface of said passageway is wettable by the said metal when liquid but the interior surface of the therein said nozzles is not wettable by the said metal when liquid.

4. The source and flow means claimed in claim 2 in which the interior surface of said passageway comprises tungsten carbide, and the interior surface of the therein said nozzles is of graphite.

Signed and Sealed this twenty-second Day of July 1975

[SEAL]

Attest:

RUTH C. MASON
Attesting Officer

C. MARSHALL DANN
Commissioner of Patents and Trademarks